Dec. 8, 1931.  W. MITCHELL  1,835,803
BEARING
Filed July 22, 1929
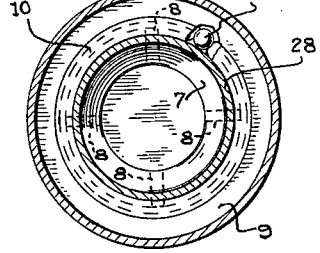
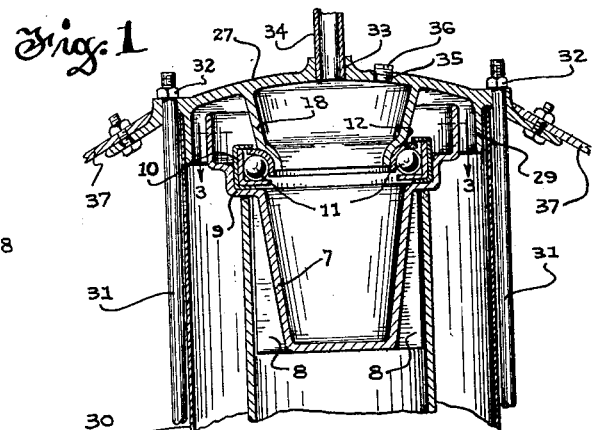
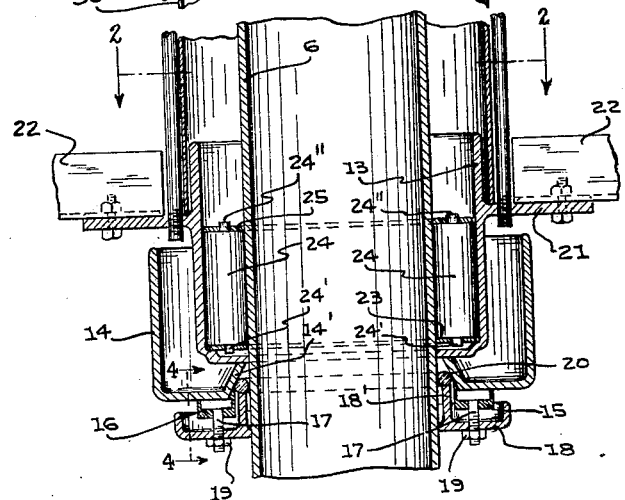
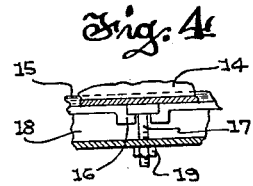
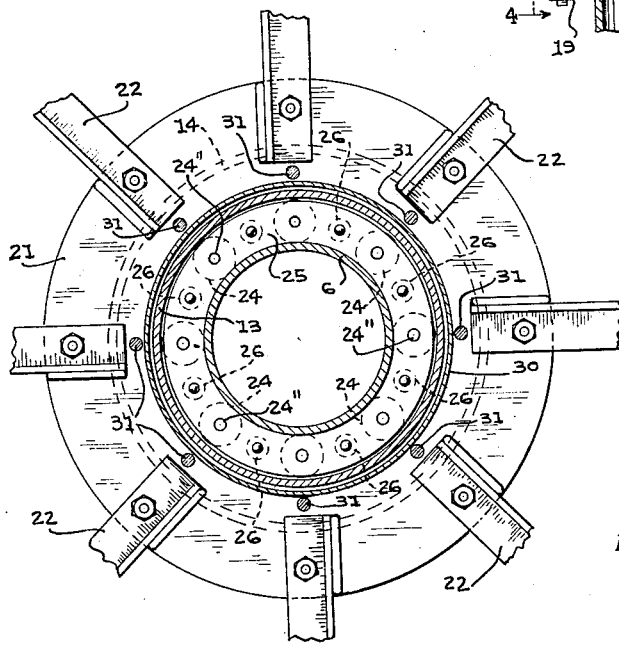
INVENTOR.
William Mitchell,
BY
Morsell, Keeney & Morsell
ATTORNEYS Patented Dec. 8, 1931

1,835,803

UNITED STATES PATENT OFFICE

WILLIAM MITCHELL, OF MILWAUKEE, WISCONSIN, ASSIGNOR TO MITCHELL MANUFACTURING COMPANY, OF MILWAUKEE, WISCONSIN, A CORPORATION OF WISCONSIN

BEARING

Application filed July 22, 1929. Serial No. 380,074.

This invention relates to improvements in bearings, and more particularly to bearings for the mounting of rotative devices on stationary vertical supports as in playground apparatus.

It is one of the objects of the invention to provide a bearing in which friction is minimized and which will turn on its mounting very easily whereby a rotative frame carried by the bearing may be turned with very little effort.

A further object of the invention is to provide a bearing which is easily assembled and which can be mounted on its support in a very simple and easy manner.

A further object of the invention is to provide a bearing which is easy to lubricate and which will retain its lubricant whereby excessive wear on and deterioration of the parts is prevented.

A further object of the invention is to provide a bearing in which the internal parts and moving surfaces are housed and enclosed to prevent rust and weather deterioration by the entrance of rain, snow and moisture.

A further object of the invention is to provide a bearing of the class described which is of very simple construction, is strong and durable, and is well adapted for the purposes described.

With the above and other objects in view the invention consists of the improved bearing, and its parts and combinations as set forth in the claims, and all equivalents thereof.

In the accompanying drawings in which the same reference characters indicate the same parts in all of the views:

Fig. 1 is a vertical sectional view of the improved bearing mounted on a supporting post;

Fig. 2 is a cross-sectional view taken on line 2—2 of Fig. 1;

Fig. 3 is a cross-sectional view taken on line 3—3 of Fig. 1; and

Fig. 4 is a detail sectional view taken on line 4—4 of Fig. 1.

Referring now more particularly to the drawings it will appear that the numeral 6 designates a vertical support in the form of a pipe or tubular member of circular form in cross-section and mounted within the upper end portion of the tubular support, extending thereinto, is a cupped member 7 formed with spaced, outwardly projecting radial fins 8. The upper end portion of the cupped member is flared and below said flared portion is an annular shoulder 9 which seats on the upper end portion of the support 6. Mounted within the cupped member on the shoulder 9 is an annular bearing formed of a non-movable lower retaining member 10 for bearing balls 11 and an inner upper curved retaining member 12 movable on and with the bearing balls.

A lower cupped member 13 revolubly surrounds a portion of the support considerably below the upper end portion thereof and said cupped member is supported from below by a lubricant reservoir 14, having an open upper end. Positioned immediately below the member 14 is an annular clamping member 15 formed at spaced intervals with slotted lug portions 16 which receive the squared heads of bolts 17, as shown in Figs. 1 and 4. The shanks of said bolts extend through spaced openings therefor in an annular wedging member 18 and nuts 19 are threaded onto the lower end portions of said bolts 17 and a tightening of said nuts will cause the upper edge of an inner annular flange 18' of the member 18 to wedgingly engage a rubber ring 20 interposed between an inner inclined wall 14' of the member 14 and the support 6, with the result that there is a clamping engagement between the members 18, 14 and 6, with the upper edge of the wall 14' engaging the lower surface of the lower cupped member 13.

The lower cupped member 13 is formed intermediate its upper and lower edges with an annular flange 21 to which are secured at spaced intervals the inner end portions of angle iron, radially extending arms 22 which form part of a rotative frame carried by the improved bearing.

There is positioned within the lower portion of the lower cupped member 13, surrounding the support 6, a flat sheet metal ring 23 and the lower studs 24' of vertically disposed roller bearings 24 are journaled therein. A similar sheet metal ring 25 is positioned on the upper ends of the roller bearings with the upper studs 24″ of the roller bearings journaled in said ring. Between pairs of roller bearings are spacing and connecting elements 26 riveted at their upper and lower ends to the rings 25 and 23 respectively.

A top cap member 27 is formed with an intermediate downwardly and inwardly extending annular wall 28 and the lower portion of said wall is curved to rotatively engage the retaining member 12 of the upper bearing. The top cap member 27 is also formed, outwardly of the upper flared portion of the member 9, with an annular wall 29 depending from its undersurface. Lodged tightly against the outer surface of said wall 29 is the upper end portion of a cylindrical sheet metal housing 30, and the lower end portion of the latter rests on the annular flange 21 of the lower cupped member 13 adjacent the outer surface of said cupped member. The top cap member 27 and the lower cupped member 13 are joined by a plurality of elongated bolts 31. The lower end portions of said bolts are threaded into threaded openings in the flange 21 of the member 13, while the upper end portions of the bolts extend through openings in the member 27, and their projecting upper end portions carry nuts 32, which, when tightened clamp the members 13 and 27 with respect to each other and also cause the housing 30 to be tightly secured in position.

The top cap member 27 is further formed with a central opening 33 for the insertion of the lower end portion of a flag staff 34, and comparatively close to the opening 33 is a tapped opening 35 normally closed by a threaded plug 36, for the introduction of lubricant into the bearing. The inner end portions of upper rotative frame arms 37 are bolted to the outer periphery of the top cap member 27.

It will therefore be seen that in the improved bearing upper and lower bearing members are provided with the upper bearing member turning within and on the flanged portion 9 of the member 7 and the lower bearing member turning about an intermediate portion of the support 6. The anti-friction members in both of the bearing members cause the same to turn very easily. The top cap member 27 is rotatively mounted on the upper bearing member and it is joined through the means previously described to the lower rotative member 13, with the result that the members 13 and 27 and all frame parts carried thereby, turn as a unit without any binding tendency because of the upper and lower bearing members.

From the structure described it is evident that the device may be assembled and mounted on a support very easily, and the parts are securely maintained in their proper positions. To lubricate the bearing parts, the plug 36 is first removed and then lubricant is introduced through the opening 35 to completely fill the upper cupped member 7 which acts as an upper reservoir. After the member 7 has been filled the introduction of the lubricant is continued and it drips over the upper edge of the member 9 and down into the lower cupped member 13, and this is continued until the last-mentioned member is filled. Both bearing members will be adequately supplied with lubricant and the supply will last an indefinite period. The housing 30 prevents splashing when the lubricant is dripping into the lower cupped member, and it acts as a lubricant retainer, and it also prevents the entrance of weather into the bearing parts.

From the foregoing description it will be seen that the improved bearing is both simple and novel, and is well adapted for the purposes described.

What I claim as my invention is:

1. A bearing, comprising a vertical tubular support, a cupped member mounted on the upper end thereof and extending thereinto, an annular bearing mounted within the upper end portion of said cupped member, a cap rotatively mounted on said bearing, a bearing member rotatively surrounding an intermediate portion of the support, and connecting members between the cap and the last-mentioned member.

2. A bearing, comprising a vertical tubular support, a cupped member mounted on the upper end thereof and extending thereinto, an annular bearing mounted within the upper end portion of said cupped member, a cap rotatively mounted on said bearing, a cupped bearing member rotatively surrounding an intermediate portion of the support, connecting members between the cap and the last-mentioned bearing member, and a receptacle non-rotatively mounted with respect to the support and surrounding a portion of the last-mentioned bearing member and supportingly engaging the lower portion thereof.

3. A bearing, comprising a vertical tubular support, a cupped member mounted on the upper end thereof and extending thereinto, an annular bearing mounted within the upper end portion of said cupped member, a cap rotatively mounted on said bearing, a cupped bearing member rotatively surrounding an intermediate portion of the support, a housing surrounding the support and extending between the cap and the lower bearing member, adjustable clamping members joining the cap and the lower bearing member and clamping therebetween said housing whereby said cap, lower bearing member and housing will turn as a unit on the support, a receptacle non-rotatively mounted with respect to the support and surrounding a portion of the last-mentioned bearing member and supportingly engaging the lower portion thereof, and a clamping member surrounding the support below the receptacle and engaging the same.

4. A bearing, comprising a vertical support, a cupped bearing member mounted on an end portion thereof and extending thereinto, a cap rotatively mounted on said bearing, a cupped bearing member rotatively surrounding an intermediate portion of the support, connecting members between the cap and the last-mentioned bearing member, a receptacle non-rotatively mounted with respect to the support and surrounding a portion of the last-mentioned bearing member and supportingly engaging the lower portion thereof, a clamping member surrounding the support below the receptacle and adjustable with respect thereto and having a wedging engagement therewith, and an annular yielding member engaging the support and wedgingly clamped between adjacent portions of the clamping member and the receptacle.

5. In a bearing construction, a support, an elongated rotative member surrounding a portion of the support, anti-friction devices interposed between upper and lower portions of the rotative member and the support, the lower portion of said rotative member being formed as a receptacle for lubricant, a non-rotative cupped member mounted on the support below the receptacle portion of the rotative member and engaging the same, an annular clamping member surrounding the support immediately below said cupped member, an annular wedging member surrounding the support immediately below said clamping member and adjustably connected to the latter, and a yielding annular member surrounding the support between adjacent portions of the cupped member, the clamping member and the wedging member and binding the parts in clamped position and forming a gasket to prevent lubricant leakage.

In testimony whereof, I affix my signature.

WILLIAM MITCHELL.